(12) United States Patent
Perkins et al.

(10) Patent No.: US 10,781,689 B2
(45) Date of Patent: Sep. 22, 2020

(54) DIGITAL 2D HOLOGRAPHIC SPECTROMETER FOR MATERIAL CHARACTERIZATION

(71) Applicant: Halliburton Energy Services, Inc., Houston, TX (US)

(72) Inventors: David L. Perkins, The Woodlands, TX (US); Christopher M. Jones, Houston, TX (US); Nagaraja Pai, Houston, TX (US); Michael T. Pelletier, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 239 days.

(21) Appl. No.: 16/072,488

(22) PCT Filed: Apr. 27, 2016

(86) PCT No.: PCT/US2016/029486
§ 371 (c)(1),
(2) Date: Jul. 24, 2018

(87) PCT Pub. No.: WO2017/188941
PCT Pub. Date: Nov. 2, 2017

(65) Prior Publication Data
US 2019/0032484 A1 Jan. 31, 2019

(51) Int. Cl.
*E21B 47/135* (2012.01)
*G03H 1/04* (2006.01)
(Continued)

(52) U.S. Cl.
CPC ............ *E21B 47/135* (2020.05); *E21B 47/00* (2013.01); *E21B 49/087* (2013.01);
(Continued)

(58) Field of Classification Search
CPC ...... E21B 47/135; E21B 47/00; E21B 49/087; G03H 1/0443; G03H 1/0866; G01V 8/02
(Continued)

(56) References Cited

U.S. PATENT DOCUMENTS

| 4,779,984 A * | 10/1988 | Cook ........................ G01J 3/02 356/451 |
| 7,127,109 B1 | 10/2006 | Kim |

(Continued)

FOREIGN PATENT DOCUMENTS

| WO | WO-2007/027073 A2 | 3/2007 |
| WO | WO-2010/140997 A1 | 12/2010 |
| WO | WO-2016-025170 A1 | 2/2016 |

OTHER PUBLICATIONS

Babin et al., "Digital Optical Spectrometer-on-chip," Applied Physics Letters 95, 041105 (2009), 3 pages.
(Continued)

*Primary Examiner* — Seung C Sohn
(74) *Attorney, Agent, or Firm* — Gilliam IP PLLC

(57) ABSTRACT

A tool including a probe deployable within a wellbore and an optical analysis device coupled to the probe is provided. The optical analysis device includes a two-dimensional (2D) waveguide layer to transmit and to disperse an electromagnetic radiation according to wavelength and including detector elements disposed along an edge, each detector element providing a signal associated with a pre-determined wavelength portion of the electromagnetic radiation. The optical analysis device also includes a substrate layer electrically coupled to receive the signal from each of the detector elements and form a spectrum of the electromagnetic radiation with the processor. A method for using the tool in a wellbore application, a pipeline application, or a reservoir storage application is also provided.

25 Claims, 11 Drawing Sheets

(51) Int. Cl.
*E21B 47/00* (2012.01)
*E21B 49/08* (2006.01)
*G03H 1/08* (2006.01)
*G01V 8/02* (2006.01)

(52) U.S. Cl.
CPC ......... *G03H 1/0443* (2013.01); *G03H 1/0866* (2013.01); *G01V 8/02* (2013.01)

(58) Field of Classification Search
USPC .................................................. 250/227.11
See application file for complete search history.

(56) References Cited

U.S. PATENT DOCUMENTS

| | | | |
|---|---|---|---|
| 7,190,856 | B1 | 3/2007 | Iazikov et al. |
| 7,315,371 | B2 | 1/2008 | Kryszczynski et al. |
| 7,327,908 | B1 | 2/2008 | Iazikov et al. |
| 7,330,614 | B1 | 2/2008 | Mossberg et al. |
| 7,649,660 | B2 | 1/2010 | Adibi et al. |
| 7,720,334 | B1 | 5/2010 | Mossberg et al. |
| 7,889,336 | B2 | 2/2011 | Yankov |
| 8,068,709 | B2 | 11/2011 | Iazikov et al. |
| 8,085,821 | B2 | 12/2011 | Yankov |
| 9,012,110 | B2 * | 4/2015 | Lowe ................ G03H 1/00 359/27 |
| 2003/0223069 | A1 | 12/2003 | DiFoggio et al. |
| 2004/0036933 | A1 | 2/2004 | Yankov et al. |
| 2012/0250017 | A1 | 10/2012 | Morys et al. |
| 2012/0250120 | A1 | 10/2012 | Ostroverkhov et al. |
| 2013/0093936 | A1 | 4/2013 | Scheeline et al. |
| 2014/0191120 | A1 | 7/2014 | Donderici et al. |
| 2014/0245827 | A1 | 9/2014 | Pope et al. |

OTHER PUBLICATIONS

Babin et al., "Fabrication of a novel digital spectrometer on chip," J. Vac Sci Technol B, vol. 27, No. 6, Nov./Dec. 2009, pp. 3187-3191 http://foundry.lbl.gov/assets/docs/pubs/MFNF_091207_SDFabrication-Novel.pdf.

Peroz et al., "Digital Planar Holograms fabricated by Step and Repeat UV nanoimprint lithography: From spectrometer chip to higher power laser diodes," IEEE-CLEO 2011 Laser Science to Photonic Applications, 2 pages http://ieeexplore.iee.org/xpl/articleDetails.jsp?arnumber=5950225, 2011.

Peroz et al., "Digital spectrometer-on-chip fabricated by step and repeat nanolithography on pre-spin coated films," Microelectronic Engineering, vol. 88, Issue 8, Aug. 2011, pp. 2092-2095, http://sciencedirect.com/science/article/pii/S0167931710005666.

Peroz et al., "Multiband wavelength demultiplexer based on digital planar holography for on-chip spectroscopy applications," Optics Letters, vol. 37, No. 4, Feb. 2012, pp. 695-697.

Peroz, et al., "High-resolution spectrometer-on-chip based on digital planar holography," IEEE Photonics Journal, vol. 3, No. 5, Oct. 2011, pp. 888-896, http://ieeexplore.ieee.org/xpl/articleDetails.jsp?reload=true&arnumber=60320412011.

Redding et al., "Compact spectrometer based on a disordered photonic chip," Nature Photonics, vol. 7, Sep. 2013, pp. 746-751 http://eng.yale.edu/caolab/papers/nphoton2013.pdf.

Redding et al., "On-chip random spectrometer," Department of Applied Physics, Yale University, 2013, 10 pages http://arxiv.org/ftp/arxiv/papers/1304/1304.2951.pdf.

Teeranutranont et al., "Digital holographic three-dimensional imaging spectrometry," Applied Optics, vol. 52, No. 1, Jan. 2013, pp. A388-A396 http://ir.iwate-u.ac.jp/dspace/bitstream/10140/4837/1/ao-v52i1pp.a388-a396.pdf.

Yankov et al., "Digital Planar Holography and Multiplexer/Demultiplexer with Discrete Dispersion," 2003, 13 pages, http://www.svphotonics.com/pub/pub034.pdf.

International Search Report and Written Opinion from PCT/US2016/029486, dated Jan. 24, 2017, 14 pages.

* cited by examiner

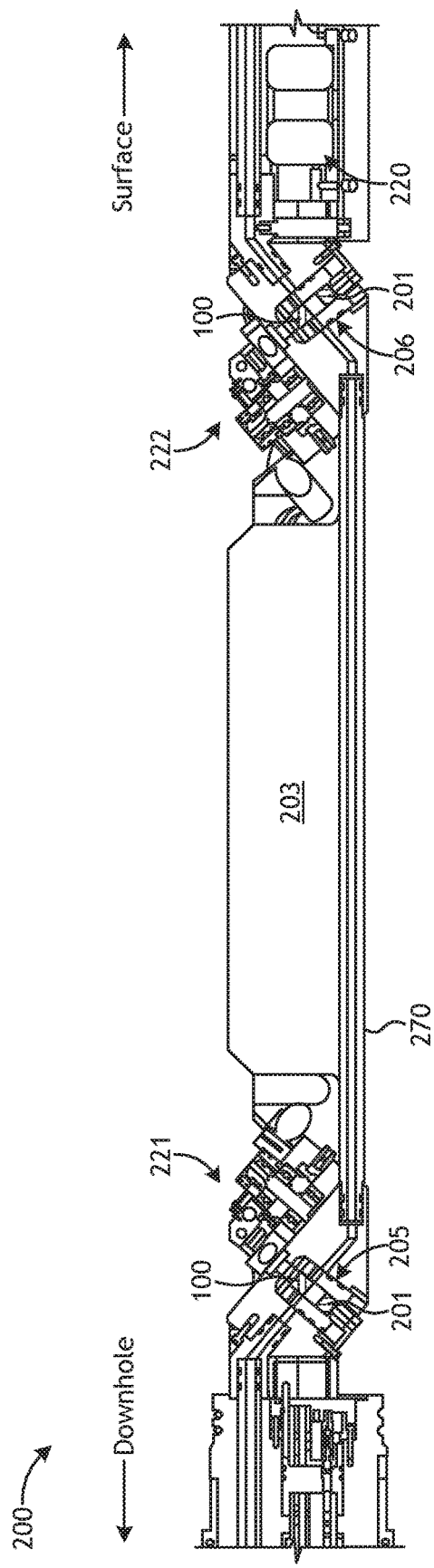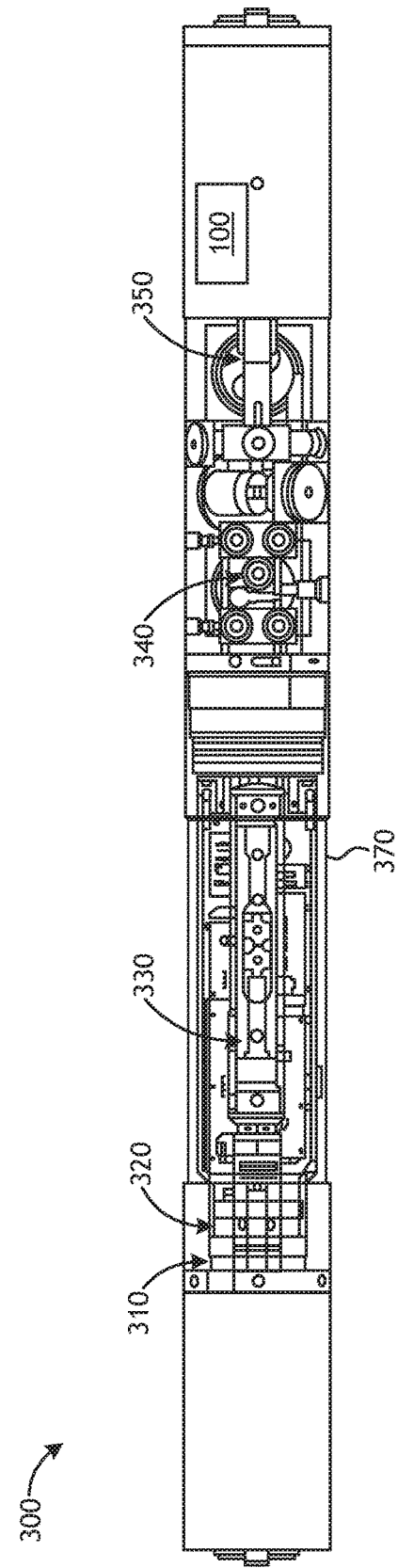

DIGITAL 2D HOLOGRAPHIC SPECTROMETER FOR MATERIAL CHARACTERIZATION

BACKGROUND

In the field of oil and gas exploration and production, material characterization such as reservoir or wellbore fluid composition is desirable to determine the quality of a product or the condition of a container, a wellbore, or a pipeline. Current dispersive spectrometers for material characterization operate in the near-infrared (NIR) over a limited wavelength range with a small number of channels (typically about 16) and with relatively low spectral resolution.

To increase spectral resolution, traditional dispersive spectrometers use narrow slit apertures to convey electromagnetic radiation in and out of the spectrometer. This reduces the signal-to-noise ratio (SNR), thereby deteriorating measurement quality and increasing measurement collection times to compensate for quality degradation. In some approaches, the length of the dispersive spectrometer is increased to achieve a desirable resolution. However, this design strategy hinders compactness and the ability to co-locate the device with the fluid in the reservoir or wellbore. Some traditional dispersive spectrometers may fit in spaces as small as a few inches per side and have been utilized in downhole fluid characterization. However, the size of these devices is still too large for use in more demanding configurations such as permanent downhole sensors.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

FIG. 2 illustrates a tool including an optical analysis device attached to an integrated characterization section (ICS) in a flow line for a wellbore application.

FIG. 3 illustrates a tool including an optical analysis device attached to a fluid identification (FLID) section for a wellbore application.

In the figures, elements or steps having the same or similar reference numerals have the same or similar description and configuration, unless stated otherwise.

DETAILED DESCRIPTION

Figure 1:
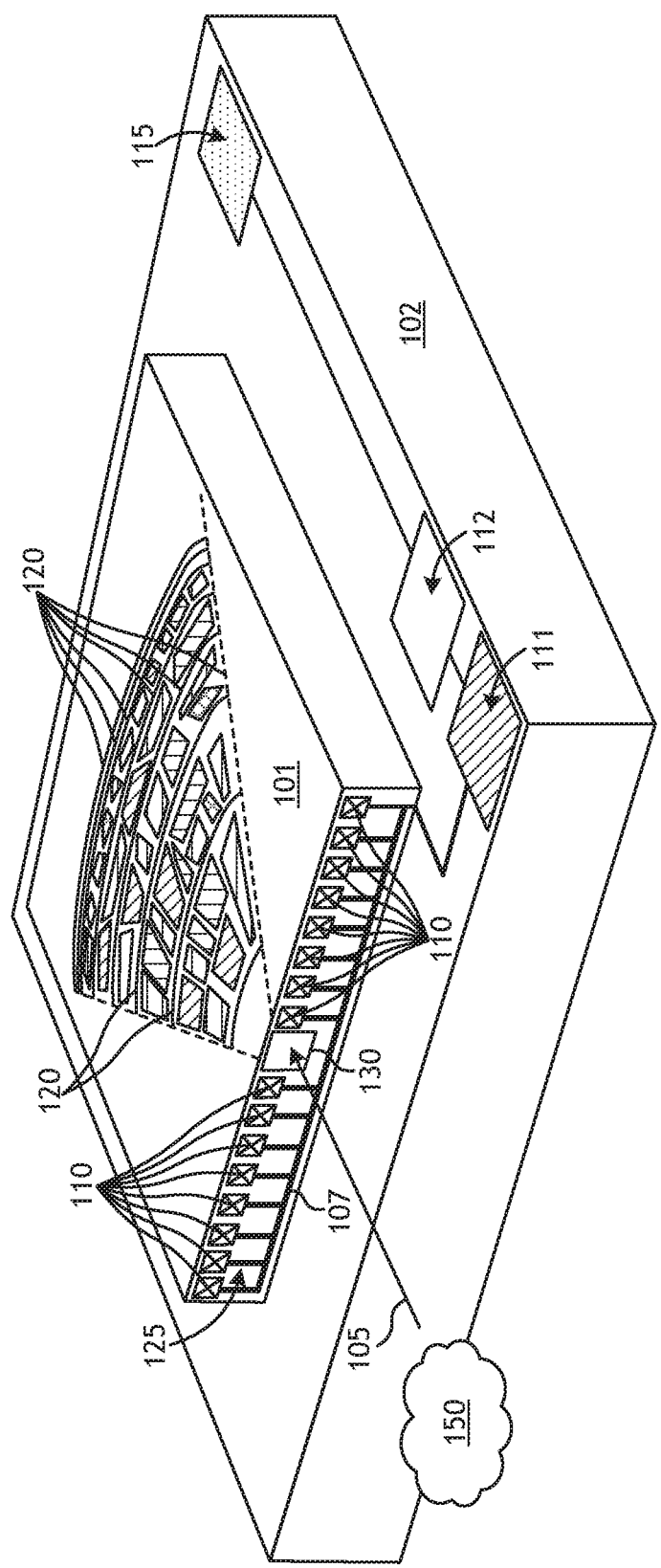
FIG. 1 illustrates an optical analysis device for use in the oil and gas industry.

The present disclosure relates to measuring characteristics of materials present within a wellbore, a pipeline or a reservoir storage for the oil and gas industry.

In the oil and gas industry, it is desirable to collect optical spectra for analysis and characterization of the different materials and samples commonly encountered in oil and gas production. It is desirable that the spectra be collected in-situ and in real-time, over extended periods and over extended geographic regions and geological formations such as rocks, sands, sediments and the like. Some examples of characterization of materials may include a gas-oil-ratio (GOR) and a methane concentration of a hydrocarbon product in a wellbore, a pipeline, or a reservoir. Some examples of reservoir or pipeline conditions to be measured include wax or scale deposition built-up on the inner surface of the container or pipeline, including hydrates, minerals, corrosion, and bacteria.

Embodiments consistent with the present disclosure involve the collection of a spectrum of electromagnetic radiation as interacted with a sample substance. The spectrum is obtained with a dispersive element formed by discrete patterns etched on a two-dimensional (2D) waveguide layer of an optical analysis device. The optical analysis device includes a substrate layer that supports the 2D waveguide layer and further includes a processor and a memory. The obtained spectrum may be stored in the memory and provided to an operator for data analysis at a different time and location from where the spectrum was obtained. A suitably calibrated multivariate processing algorithm may be used to determine a characteristic of interest of the sample based on the obtained spectrum.

In some embodiments, the discrete patterns etched on a 2D waveguide layer include trenches having a pre-determined thickness and a pre-determined depth, but different length and orientation along the plane of the 2D waveguide layer. In these embodiments, the discrete patterns form a "digital" profile on the 2D waveguide layer, and the dispersion of a propagating electromagnetic radiation forms a spectrum along an edge of the 2D waveguide layer. The details of the spectrum depend on the orientation of the edge relative to the direction of propagation of the electromagnetic radiation. Thus, the spectrum forms a hologram enabling arbitrary discrete spectral and spatial signal arrangement and distribution. Accordingly, such 2D waveguide layers are known as 2D digital planar hologram (DPH) spectrometers. DPH spectrometers offer a small form factor, low power consumption, relatively high resolution, and a large number of optical channels compared to other dispersive spectrometers commonly used in the art. Use of DPH spectrometers for an optical analysis device in oil and gas exploration and production as disclosed herein allows real-time, in-situ material characterization such as wellbore and reservoir fluid composition, or a container and pipeline condition. In some embodiments, DPH spectrometers include up to 500-1000 channels over the visible (VIS, 400 nm-750 nm) and NIR (750 nm-2500 nm) spectral ranges and provide spectral resolution from about 0.15 nm to about 0.18 nm.

In some embodiments, the trenches are formed along the surface of 2D waveguide layer with well-known thin film fabrication and etching technologies. Thus, combining the flexibility and control of holography with the manufacturability of current thin film technologies, embodiments in this disclosure may be used in low power, small, easily deployed, and inexpensive optical analysis devices. Optical analysis devices as disclosed herein may operate with no slits, having inherently higher SNR than slit-based dispersive spectrometers of comparable dimensions.

Embodiments consistent with the present disclosure help facilitate the collection of raw spectral data, thus relaxing calibration steps and the need for an extended calibration database. In that regard, devices and methods consistent with the present disclosure provide measurements that are more tolerant to drastic changes in sample conditions, provided the spectral bandwidth of the optical response of the new sample is maintained within the spectral bandwidth of the DPH spectrometer. Consequently, the need to interpolate or extrapolate a response change from the sample using calibrated data points may be generally avoided.

As used herein, the term "characteristic" refers to a chemical, mechanical, or physical property of a substance. A characteristic of a substance may include a quantitative or qualitative value of one or more chemical constituents or compounds present therein, or any physical property associated therewith. Such chemical constituents and compounds may be referred to herein as "analytes." Illustrative characteristics of a substance that can be monitored with the optical computing devices described herein include, for example, chemical composition (e.g., identity and concentration in total or of individual components), phase presence (e.g., gas, oil, water, etc.), impurity content, pH, alkalinity, viscosity, density, ionic strength, total dissolved solids, salt content (e.g., salinity), porosity, opacity, bacteria content, total hardness, combinations thereof, state of matter (solid, liquid, gas, emulsion, mixtures), and the like.

As used herein, the term "electromagnetic radiation" refers to radio waves, microwave radiation, infrared and near-infrared radiation, visible light, ultraviolet light, X-ray radiation and gamma ray radiation. As used herein, the term "optically interact" or variations thereof refers to the reflection, transmission, scattering, diffraction, or absorption of electromagnetic radiation either on, through, or from one or more processing elements or a substance being analyzed by the processing elements. Accordingly, optically interacted light refers to electromagnetic radiation that has been reflected, transmitted, scattered, diffracted, or absorbed by, emitted, or re-radiated, for example, using a processing element, but may also apply to interaction with a substance.

In a first embodiment, a tool includes a probe configured to be deployed in a wellbore, and an optical analysis device attached to the probe. The optical analysis device includes a 2D waveguide layer configured to transmit and to disperse electromagnetic radiation according to wavelength. The 2D waveguide layer may include a plurality of detector elements disposed along an edge of the 2D waveguide layer so that each detector element provides a signal associated with a pre-determined wavelength portion of the electromagnetic radiation. The optical analysis device also includes a substrate layer that includes a processor and a memory. The substrate layer may be electrically coupled with the 2D waveguide layer to receive the signal from each of the detector elements and form a spectrum of the electromagnetic radiation with the processor.

In a second embodiment, a method includes deploying a probe in a wellbore or a reservoir. The probe includes an optical analysis device, which includes a 2D waveguide layer configured to transmit and disperse an electromagnetic radiation according to wavelength. The method also includes adjusting a depth of measurement for the probe and obtaining a spectrum with the optical analysis device at a specified depth. In some embodiments, the method further includes obtaining a characteristic of at least one of a fluid, a formation in the wellbore, or a container in the reservoir. In some embodiments, the method includes adjusting a wellbore operation or a reservoir storage based on the characteristic of at least one of the fluid, the formation in the wellbore, or the container in the reservoir.

In a third embodiment, a non-transitory, computer readable medium stores commands which, when executed by a processor in a tool, cause the tool to perform a method. The method includes deploying a probe in a wellbore or a reservoir. The probe includes an optical analysis device having a 2D waveguide layer configured to transmit and disperse an electromagnetic radiation according to wavelength. The method further includes adjusting a depth of measurement for the probe and obtaining a spectrum with the optical analysis device at a specified depth. The method may further include obtaining a characteristic of at least one of a fluid, a formation in the wellbore, or a container in the reservoir. In some embodiments, the method includes adjusting a wellbore operation or a reservoir storage based on the characteristic of at least one of the fluid, the formation in the wellbore, or the container in the reservoir. In some embodiments, adjusting the wellbore operation or the reservoir storage includes modifying a fluid in the wellbore or in the reservoir.

FIG. 1 illustrates an optical analysis device 100 for use in the oil and gas industry. Optical analysis device 100 includes a 2D waveguide layer 101 configured to transmit and disperse electromagnetic radiation 105 according to wavelength. Electromagnetic radiation 105 propagates from a sample 150 following optical interaction with the sample 150, where the sample 150 may be a fluid in a wellbore, a reservoir or a pipeline, or may alternatively be a solid component forming part of or disposed on a wellbore wall, a pipeline, or a container. Two-dimensional waveguide layer 101 includes a plurality of detector elements 110 disposed along an edge 125 so that each detector element 110 provides a signal associated with a pre-determined wavelength portion of the electromagnetic radiation. As illustrated, detector elements 110 may form a linear array detector on edge 125.

Optical analysis device 100 may also include a substrate layer 102, a processor 111 and a memory 112. Substrate layer 102 is electrically coupled with 2D waveguide layer 101 through conducting lines 107 and receives the signal in processor 111 from each of detector elements 110. Processor 111 forms a spectrum of electromagnetic radiation 105 and stores the spectrum in memory 112.

Substrate layer 102 may also include a device identifier 115. In some embodiments, device identifier 115 includes a radio-frequency (RF) identification (RFID) circuit, an RF antenna, or a near-field contact (NFC) circuit, so that optical sensing device 100 may be remotely, or wirelessly identified by an external device. Moreover, device identifier 115 may also be configured to wirelessly provide to an external device data including the spectrum obtained with detector elements 110, processed with processor 111, and stored in memory 112.

In some embodiments, 2D waveguide layer 101 includes trenches 120 specifically located and oriented in order to direct output light into designed focal points along edge 125 according to wavelength. In some embodiments, trenches 120 include millions of features disposed on 2D waveguide layer 101 according to a computer-designed DPH spectrometer. In some embodiments, trenches 120 may include sub-wavelength features selected to generate an orientation dependent diffraction pattern of electromagnetic radiation 105. Two-dimensional waveguide layer 101 may be formed of a material substantially transparent to the propagation of electromagnetic radiation 105 at the wavelengths of interest. In some embodiments, for instance, 2D waveguide layer 101 may be formed with silicon dioxide or hafnium dioxide.

Trenches 120 may be formed or otherwise defined onto 2D waveguide layer 101 using electron beam lithography and dry etching. Alternatively, the etching technique used to form trenches 120 may be any etching technique known in the art that is compatible with the material in 2D waveguide layer and the feature dimensions of trenches 120 (e.g., width and depth). Some embodiments of optical analysis device 100 may include up to a thousand (1000) detector elements 110 for electromagnetic radiation 105 having a spectrum centered at a wavelength of 660 nm.

In operation, electromagnetic radiation 105 enters 2D waveguide layer 101 through optical input 130 and is diffracted from trenches 120 as a function of wavelength. 2D waveguide layer 101 acts as a dispersive spectrometer when optically coupling electromagnetic radiation 105 to optical input 130 and detector elements 110. In some embodiments, electromagnetic radiation 105 may be coupled to 2D waveguide layer 101 by a fiber optic cable (e.g., a single-mode or a multi-mode fiber) or any other compact waveguide device. 2D waveguide layer 101 may provide a spectrum along edge 125 having a resolution between about 0.1 nm to about 0.5 nm and over a broad spectral range (500-1000 nm). In some embodiments, 2D waveguide layer 101 may be configured to provide spectra across a wavelength range between 600 nm-690 nm, a wavelength range between 590 nm-690 nm, a wavelength range between 760 nm-920 nm, and a combination of wavelength ranges between 630 nm-690 nm and 760 nm-850 nm. Moreover, 2D waveguide layer 101 may include trenches 120 selected to provide a spectrum in a NIR wavelength range (e.g., a wavelength range included between 750 nm-2500 nm).

In some embodiments, 2D waveguide layer 101 may have a reduced form factor of only a few tenths of an inch, leading to an optical analysis device 100 that has a form factor of about an inch by each side, or even less. Accordingly, optical analysis device 100 may have much smaller dimensions as compared to traditional dispersive spectrometers having similar spectral resolution. This is due to the accrued diffraction effect of the millions of features of trenches 120 as electromagnetic radiation 105 propagates forward and backward through 2D waveguide layer 101. In contrast, traditional spectrometers are larger (about a few inches on the side) due to the need for a longer optical path length from a grating or within a prism to obtain the desired wavelength dispersion. The compactness of optical sensing device 100 allows some embodiments to be utilized in permanent downhole sensors and to incorporate optical sensing device 100 with existing oil and gas service equipment for spectral data acquisition. More specifically, a compact optical sensing device 100 may be mounted in a thermos-type container forming a reduced size tool that is able to operate in the hostile downhole temperatures (typically 200° C. or even more).

While 2D waveguide layer 101 is shown as a generally planar construct, it is understood that embodiments consistent with the present disclosure may include any 2D surface adapted to a volumetric object (e.g., a portion of a cylinder, a sphere, or a volume having an arbitrary shape). Moreover, 2D waveguide layer 101 may have any planar shape other than the square illustrated in FIG. 1. For example, edge 125 may have any polygonal orientation relative to optical input 130.

Optical analysis device 100 may be used in measuring while drilling (MWD) or logging while drilling (LWD) applications, due to its compactness and the fact that there are no moving parts involved in the spectral collection. Embodiments lacking movable parts have the additional advantage in drawing lower operation power as compared with other devices having motors and actuators to activate shutters and the like. Accordingly, some embodiments include an integrated battery or fuel cell (not shown) coupled to substrate layer 102 to power the device, lasting for long periods of time. Embodiments of tools including optical analysis device 100 are free of shutters, motors, and the need for optical alignment, thus being advantageous in the oil and gas industry for their mechanical reliability and power efficiency.

In-situ spectra obtained with optical sensing device 100 may be used to collect raw data in case a hydrocarbon product in a wellbore or reservoir does not match a fluid in an existing database. Also, optical sensing device 100 may be used to obtain raw data in situations where the hydrocarbon product or fluid in the wellbore or reservoir is a multiphase fluid mixture also not available in an existing database. Thus, the spectral data recorded with optical sensing device 100 may be incorporated to a calibration database updated with the new fluid. In some embodiments, optical analysis device 100 collects a spectrum in only a few milliseconds (ms), thereby enabling a tool to perform fluid characterization in-situ, in real time.

FIG. 2 illustrates an exemplary tool 200 that may incorporate optical analysis device 100, according to one or more embodiments. As illustrated, tool 200 may be attached to an integrated characterization section (ICS) 270 in a flow line. Tool 200 may be packaged and otherwise configured to be conveyed downhole for various wellbore monitoring applications. For example, in some embodiments, tool 200 may be attached to or form part of a logging tool and conveyed downhole on wireline, slickline, or another similar type of conveyance. In other embodiments, tool 200 may be attached to or included in a drilling application and conveyed downhole as part of a logging while drilling (LWD) tool. ICS 270 includes a first ICS sensor 221 and a second ICS sensor 222 separated by a link 203. Without loss of generality, first ICS sensor 221 is positioned on the "downhole" side of link 203 (i.e., the side of link 203 closest to the toe or bottom of the wellbore), and second ICS sensor 222 is positioned on the "surface" side of link 203 (i.e., the side of link 203 closest to the surface).

A first fluid cell 205 and a second fluid cell 206 included in tool 200 collect wellbore fluid for measurement in first ICS sensor 221 and in second ICS sensor 222, respectively. Optical analysis devices 100 are suitably located in first and second fluid cells 205 and 206 and simultaneously measure a fluid spectrum in parallel to ICS sensors 221 and 222.

Some embodiments include a light source 201 in proximity to each optical analysis device 100 to provide electromagnetic radiation 105 (FIG. 1). Optical analysis devices 100 may also or alternatively be optically coupled to fluid cells 205 and 206 through optical fibers, so that fluid cells 205 and 206 may be spaced apart from optical analysis devices 100. A power transformer 220 provides power to ICS sensors 221 and 222 and may also provide power to light sources 201 and optical analysis devices 100.

FIG. 3 illustrates another exemplary tool 300 that may incorporate or otherwise include optical analysis device 100 of FIG. 1, according to one or more embodiments. As illustrated, tool 300 may be attached to a fluid identification (FLID) section 370. Similar to tool 200 of FIG. 2, tool 300 may be packaged and otherwise configured to be conveyed downhole for various wellbore monitoring applications. In some embodiments, for instance, tool 300 may be attached to or form part of a logging tool and conveyed downhole on wireline, slickline, or another similar type of conveyance. In other embodiments, tool 300 may be attached to or included in a drilling application and conveyed downhole as part of a logging while drilling (LWD) tool FLID section 300 includes a fluid temperature sensor 310, a pressure sensor 320, a density meter 330 ("densitometer"), a resistivity sensor 340, and a capacitance sensor 350 in addition to optical analysis device 100. The small form factor of optical analysis device 100 allows it to be included in FLID section 300 without any or significant re-tooling and with low impact in the power consumption of the section.

Figure 4A:
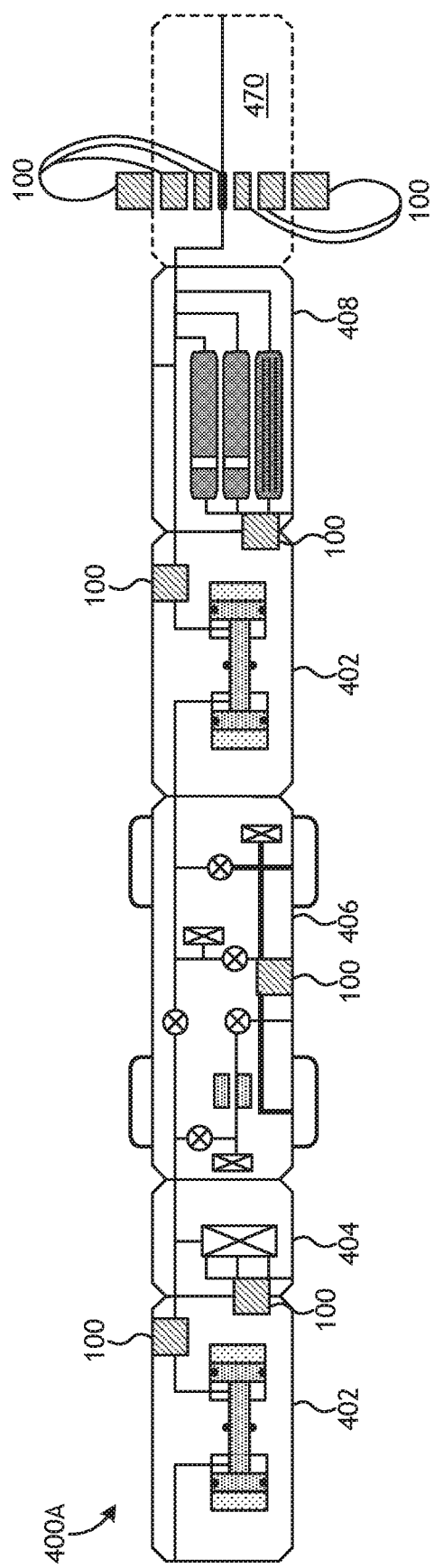
FIG. 4A illustrates a tool string including an optical analysis device for a wellbore application.

FIG. 4A illustrates a tool string 400A including optical analysis device 100 of FIG. 1, according to one or more additional embodiments. Tool string 400A may be a part of a reservoir description tool (i.e., RDT™ available from Halliburton Energy Services of Houston, Tex.) or a GEO TAP® device used in the oil and gas industry (e.g., in wireline logging, MWD or LWD applications. Because of its small form factor, optical analysis device 100 may be added as a component to any one of the various RDT™ tools in tool string 400A. Without limitation, tool string 400A includes a flow control pump-out section (FPS) 402, a quartz gauge section (QGS) 404, a straddle packer section (SPS) 406, and a multi-chamber sample collection module (MCS) 408. Each of sections 402, 404, 406 and module 408 may include at least one optical analysis device 100 to collect a spectrum of a sample of the fluid transiting through each section/module.

Some embodiments include optical analysis device 100 attached to an optical probe 470 especially dedicated to the collection of spectral data. Optical probe 470 may include a plurality of optical analysis devices 100 arranged radially around a central portion where a fluid conduit carries the sample flow. Each of optical analysis devices 100 in optical probe 470 may be configured to collect a spectrum in a different wavelength range. Further, optical probe 470 may include a hollow cylindrical portion made of a strong, transparent material such as sapphire. The hydrocarbon fluid passes at the center of the hollow cylindrical portion, and optical analysis devices 100 may be arranged radially on the hollow cylindrical portion with a sensor edge (e.g., edge 125 of FIG. 1) along the cylindrical axis. In some embodiments, optical analysis devices 100 and the hollow cylindrical sapphire portion form a fin-like structure in probe 470.

In some embodiments, the compactness of optical analysis device 100 enables it to be positioned close to pads used as fluid entry points of sections 402, 404, 406, and module 408. This in turn is beneficial for fluid characterization because trace amounts of contaminants and other fluid components of interest may be adsorbed to the metal structure and walls of sections 402, 404, 406, and of module 408. Thus, measurements of trace contaminants and components may be more accurate if performed near or at fluid entry points of sections 402, 404, 406 and module 408.

Figure 4B:
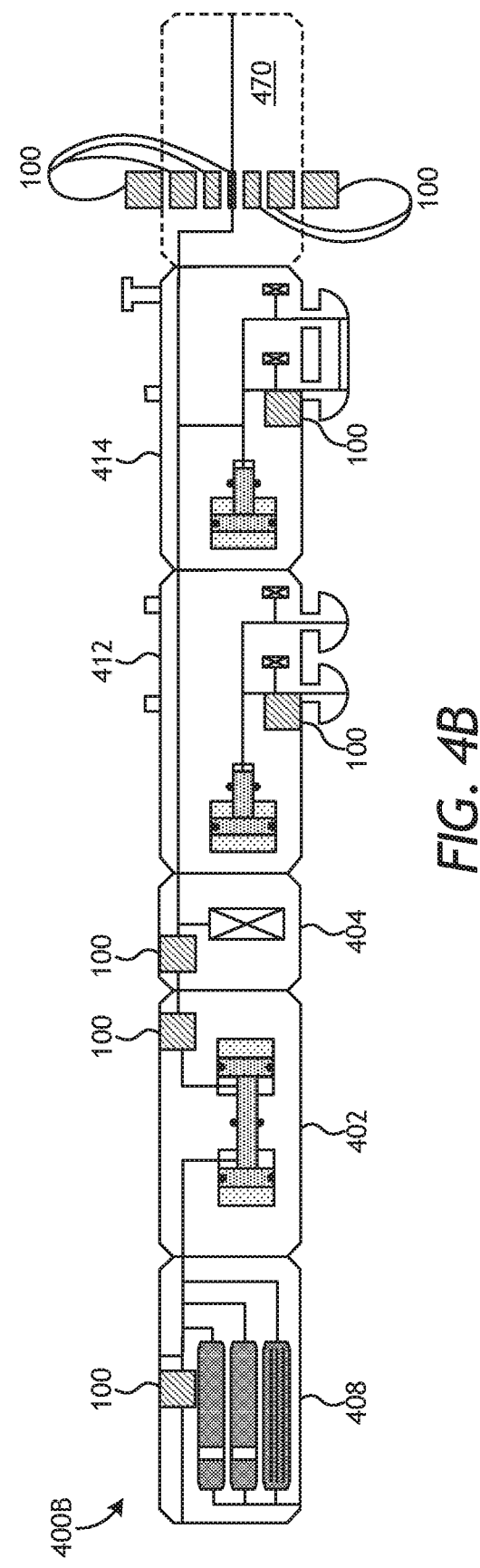
FIG. 4B illustrates a tool string including an optical analysis device for a wellbore application.

FIG. 4B illustrates another exemplary tool string 400B including optical analysis device 100 of FIG. 1, according to one or more additional embodiments. Similar to the tool string 400A of FIG. 4A, tool string 400B includes FPS 402, QGS 404, SPS 406, and MCS 408. Tool string 400B further includes dual probe section (DPS) 412 and oval pad section (OPS) 414. In some embodiments, as illustrated, tool string 400B may also include optical probe 470, as described above.

A plurality of optical analysis devices 100 in different sections of tool strings 400A and 400B may determine sections where the fluid includes a liquid phase, a foam phase, and a gas phase. Accordingly, tools strings 400A and 400B may determine when a break out into multiple phases occurs in the fluid flow. Thus, based on measurements provided by tool strings 400A and 400B, an operator of a wellbore may take corrective actions to ensure single-phase hydrocarbon flow when this is desirable. Moreover, the wellbore operator may desire to extract the hydrocarbon product as fast as possible up to a point in which tool string 400A or 400B reports a break out of the fluid. To increase sensitivity to fluid break out, some embodiments of a tool string as disclosed above may include optical analysis devices 100 disposed radially on the optical probe 470 section. In this configuration, tool strings 400A and 400B are sensitive to break out between the bottom of a horizontal pipeline and the top portion of the horizontal pipeline.

Figure 5:
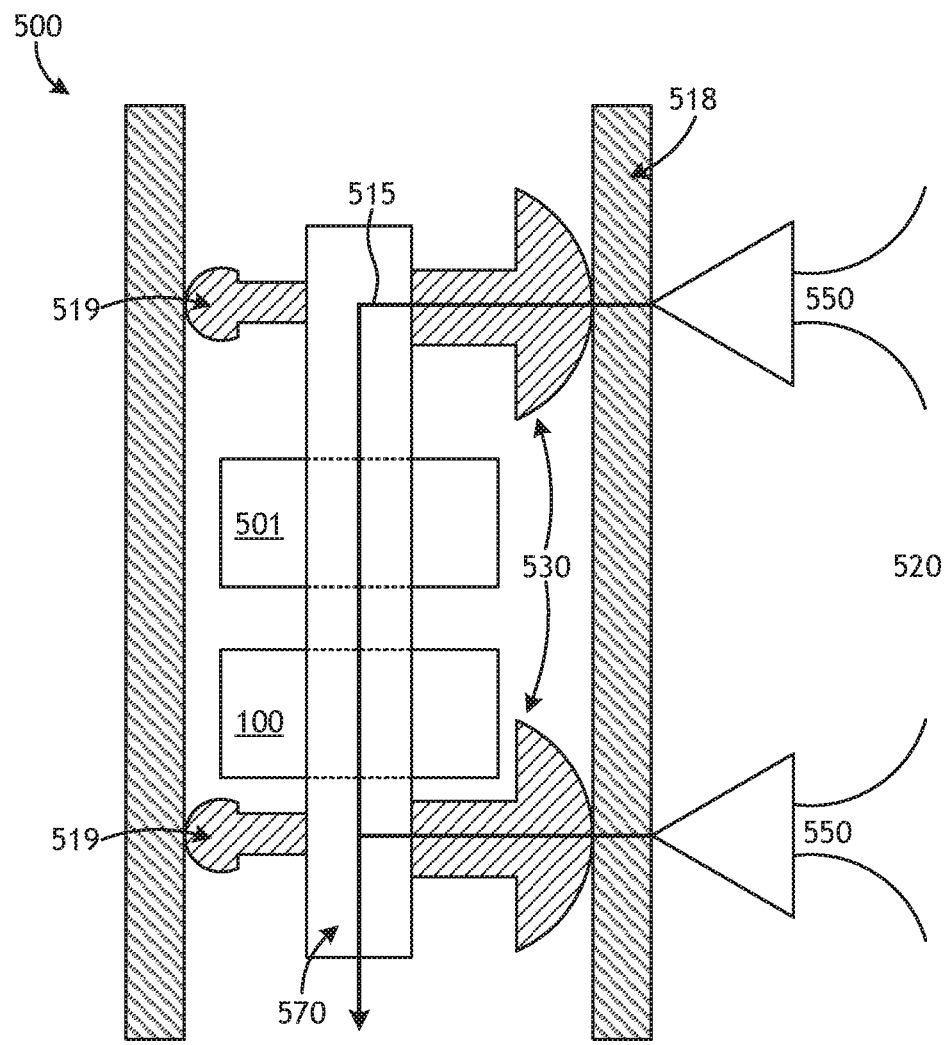
FIG. 5 illustrates a tool including an optical analysis device attached to an enhanced probe section (EPS) for wellbore applications.

FIG. 5 illustrates another exemplary tool 500 including optical analysis device 100, according to one or more embodiments. Without limitation, tools 200, 300, 400A, 400B and 500 in FIGS. 2-5 may be used in various wellbore monitoring applications and conveyed downhole as part of a drilling assembly or otherwise on wireline, slickline, or another similar type of conveyance. As illustrated, tool 500 may be attached to an enhanced probe section (EPS) 570 for wellbore applications. EPS 570 slides within wellbore 518 through a formation 520 using supports 519 and pads 530. EPS 570 receives an intake of formation fluid 550 through pads 530 fluidically coupled with a conduit 515. EPS 570 may be as DPS 412 (cf. FIG. 412), where a dual sensor includes two versions of the same sensor (e.g., two optically based devices). More generally, EPS 570 may include an enhanced ICE-based device 501 configured to measure a different optical property of the fluid compared to optical analysis device 100. Optical analysis device 100 is positioned along the path of formation fluid 550 in conduit 515 to obtain a spectrum of formation fluid 550. In some embodiments, an optical analysis device as disclosed herein may be configured to obtain an estimation of mud filtrate contamination in formation fluid 550. Some embodiments of EPS 570 include an optical analysis device having an integrated computational element (ICE), or ICE-based optical analysis device 501. An ICE is an optical element configured to return an interacted electromagnetic radiation with an intensity proportional to the result of a multivariate regression operation to identify or quantify a desired characteristic of a sample. In some embodiments, an ICE may include a plurality of alternating layers of two dielectric materials having different indices of refraction. In such embodiments, the thickness and number of the layers in the ICE may be selected according to a regression vector of the desired characteristic of the sample. ICE-based device 501 may be a micro-ICE configuration including a microfluidic circuit to sample at least a portion of formation fluid 550. In some embodiments, ICE-based device 501 and optical analysis device 100 may share a light source to generate electromagnetic radiation 105.

Optical analysis device 100 may supplement ICE-based device 501 with spectral data, for use in combination with an ICE signal to measure a sample characteristic. In some embodiments, optical analysis device 100 may be used by itself to provide a different sample characteristic from that obtained with ICE-based device 501.

Figure 6:
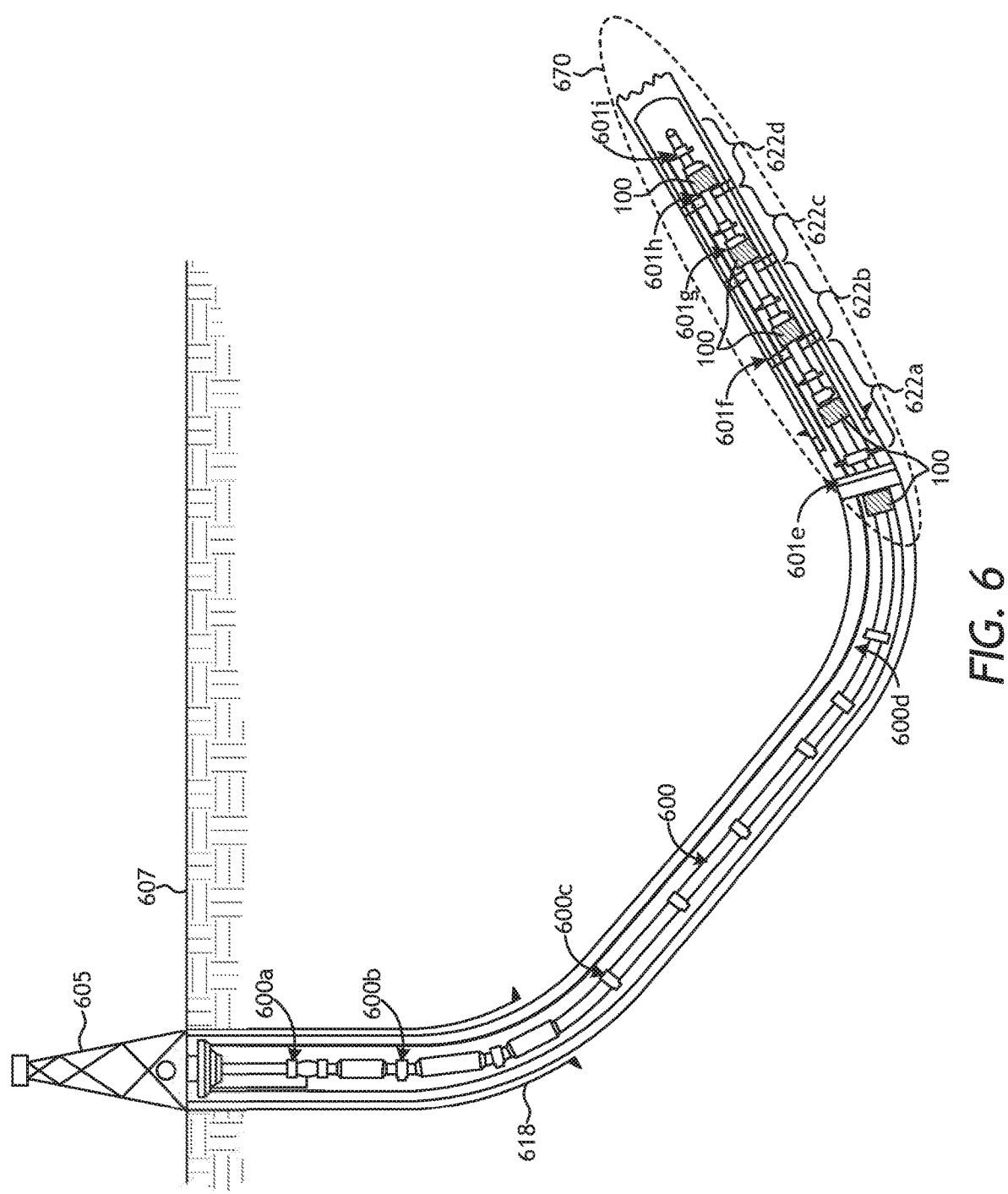
FIG. 6 illustrates an intelligent well completion (IWC) system including a plurality of optical analysis devices attached to a probe.

FIG. 6 illustrates an intelligent well completion (IWC) system 600 that may incorporate the principles of the present disclosure. As illustrated, IWC system 600 may have a plurality of components 601a-i (hereinafter collectively referred to as components 601), including a plurality of optical analysis devices 100 attached to a probe 670 arranged at a distal end of IWC system 600. IWC system 600 is introduced into a wellbore 618 from derrick 605, at a surface location 607. Without limitation, surface location 607 may be the surface of solid ground, of an ice core (e.g., in a polar oil and gas production environment), or of a body of water (in an underwater oil and gas production environment). Components 601 may include a plurality of tools and components such as safety valve 601a, heavy weight ballast tubing 601b, conventional gas lift valves 601c, a sliding side door 601d, a production packer 601e, internal and external swell packers 601f, permanent gauges 601g, a distributed temperature system 601h, and internal control valves 600i. In some embodiments, optical analysis devices 100 are distributed along discrete locations within or nearby any one of the plurality of tools and components in IWC 600.

Internal control valves 600i partition probe 670 into a plurality of zones 622a-d (hereinafter collectively referred to as zones 622). Each zone 622 may include at least one optical analysis device 100. Optical analysis devices 100 collect spectra of fluids from individual zones 622. In some embodiments, at least one optical analysis device 100 collects spectrum from the combined fluid at production packer 600d.

Figure 7:
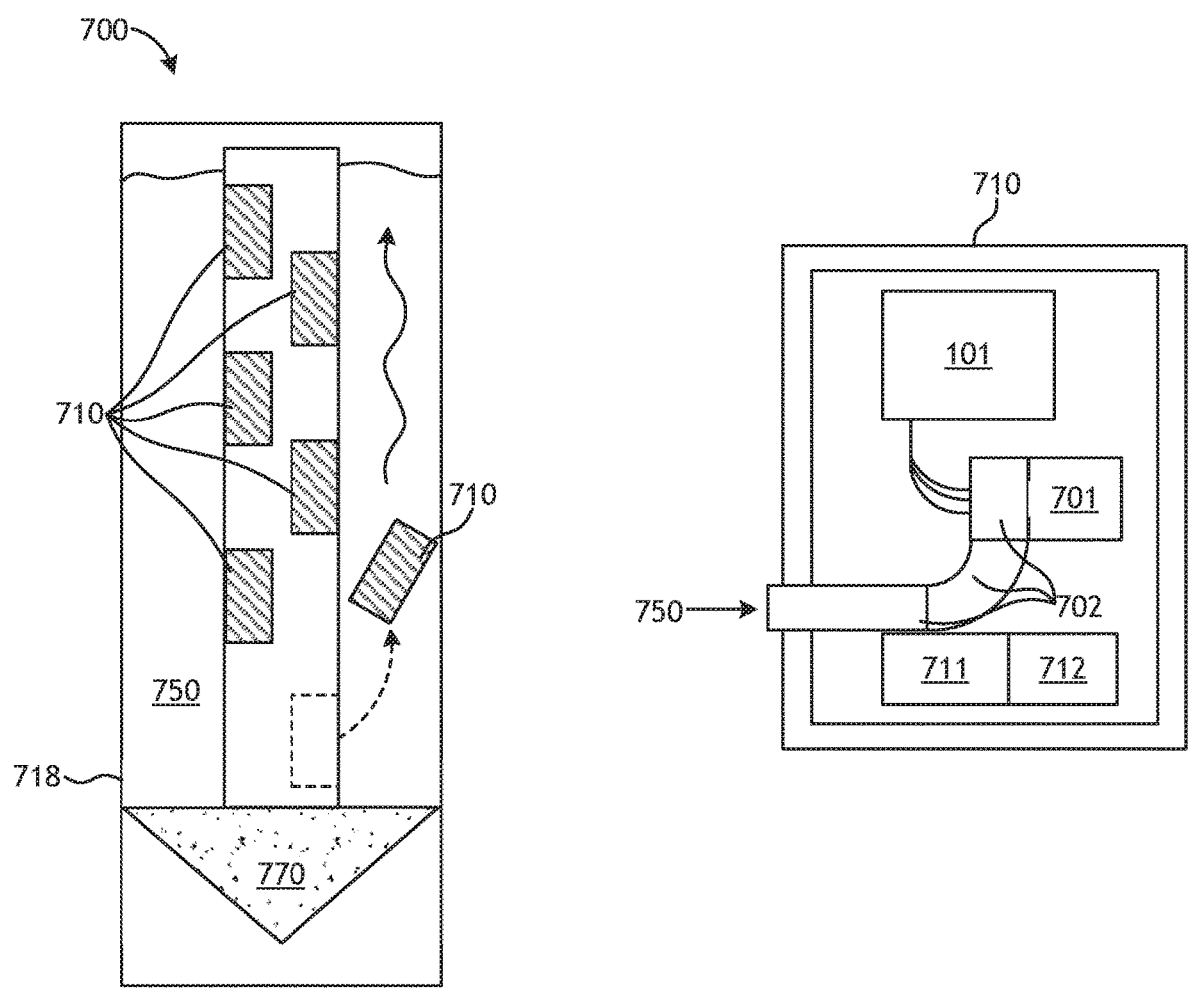
FIG. 7 illustrates a tool including a plurality of self-contained optical analysis devices removably attached to a probe.

FIG. 7 illustrates a tool 700 including a plurality of self-contained optical analysis devices 710 removably attached to a probe 770 in a wellbore 718. Self-contained optical analysis device 710 includes a microfluidic circuit 702 coupled with 2D waveguide layer 101 (cf. FIG. 1). Probe 770 is lowered into wellbore 718. In some embodiments, probe 770 is loaded with air at a pre-selected pressure to reach a pre-determined depth in wellbore 718. Wellbore 718 may be an open and active wellbore, a cased and inactive wellbore, or a reservoir container. In operation, device 710 may be configured to detach from probe 770 at a pre-selected depth and enter the fluid flow stream (or a stagnant fluid) in wellbore 718. Thus, a portion of wellbore fluid 750 enters a microfluidic circuit 702 (e.g., by capillary action) to be interacted with electromagnetic radiation 105 (FIG. 1) emitted by light source 701. A processor 711 collects the signals from 2D waveguide layer 101 and forms a spectrum that is stored in a memory 712. Devices 710 detach from probe 770 at pre-determined depths and move up to the surface of wellbore 718, where they may be collected for data extraction.

Each self-contained optical analysis device 710 is lightweight or designed for positive buoyancy in fluid 750 so that it is able to reach the surface of wellbore 718 shortly after detachment from probe 770. Self-contained optical analysis device 710 is later retrieved and the data extracted from memory 712 for analysis. In some embodiments, interacted light 105 is coupled into 2D waveguide layer 101 by fiber optics or a similar waveguide mechanism.

Figure 8:
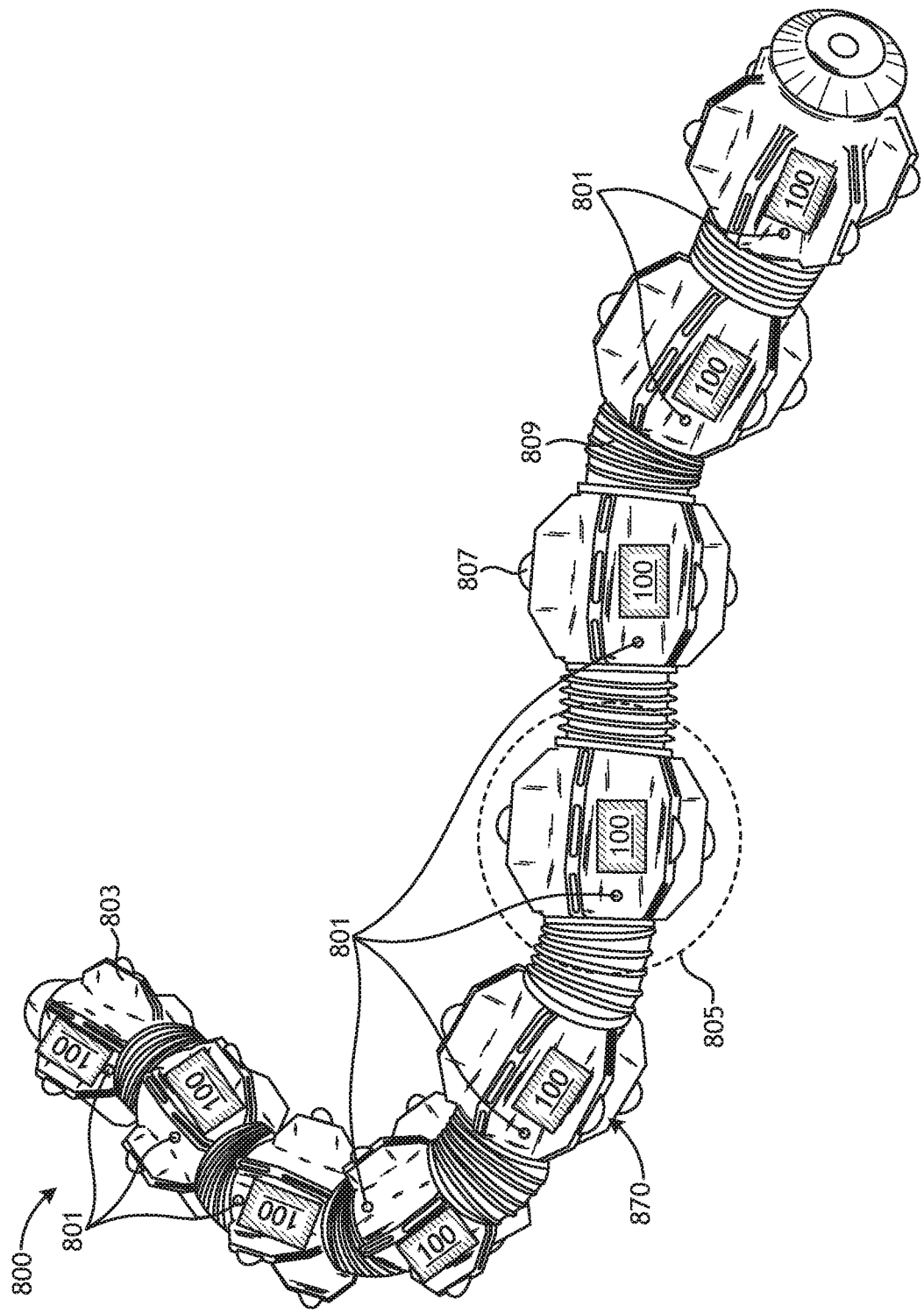
FIG. 8 illustrates a tool including a plurality of optical analysis devices attached to a probe.

FIG. 8 illustrates a tool 800 including a plurality of optical analysis devices 100 attached to a probe 870. In some embodiments, probe 870 also includes at least one or a plurality of light sources 801 to provide electromagnetic radiation 105 (FIG. 1) for each optical analysis device 100. Without loss of generality, probe 870 may include a smart, self-propelled tool such as a "snake" tool including a plurality of interconnected links 805. More generally, probe 870 may be any type of submersible robot configured to descend a specified depth within a wellbore or a container. Links 805 may be joined through bladders 809 having a selected density to control the buoyancy of tool 800, thereby adjusting a desired depth reached in a wellbore or reservoir for measurement or a desired speed of submersion of tool 800. In some embodiments, as illustrated, each interconnected link 805 may include a wheel 807 that allows probe 870 to move along against a wellbore wall, or a pipeline wall, or a container wall.

In some embodiments, probe 870 may be configured to descend or otherwise be immersed to a selected depth inside a wellbore or reservoir. One or more of optical analysis devices 100 may further include a pressure sensor 803. In some embodiments, probe 870 moves along a wall of a pipeline or container in the wellbore or reservoir and collects spectra, while also recording the depth at which each spectrum is collected. Accordingly, processor 111 (FIG. 1) in optical analysis device 100 determines an immersion depth associated with the collected spectrum (e.g., using a pressure measurement), and memory 112 (FIG. 1) stores the spectrum and the immersion depth. In some embodiments, tool 800 is configured moves up and down along the wellbore or reservoir while transmitting data collected by optical analysis device 100 at different depths to the surface of the wellbore or reservoir. Tool 800 may be configured to transmit data acoustically, or wirelessly using RF signaling. Examples of material characterization that may be performed with tool 800 for well abandonment include, without limitation, detection and quantification of a gas (e.g., air), a liquid (e.g., water or crude oil leaking into the reservoir), or a solid such as a wax, scale, corrosion, and bacterial contamination.

Probe 870 may include other types of smart self-propelled sensor platforms for autonomous well monitoring and/or well abandonment. Fluid can by pumped to a fluid sampling cell (e.g., microfluidic circuit 702) periodically to sample for the presence of fluid components.

Figure 9:
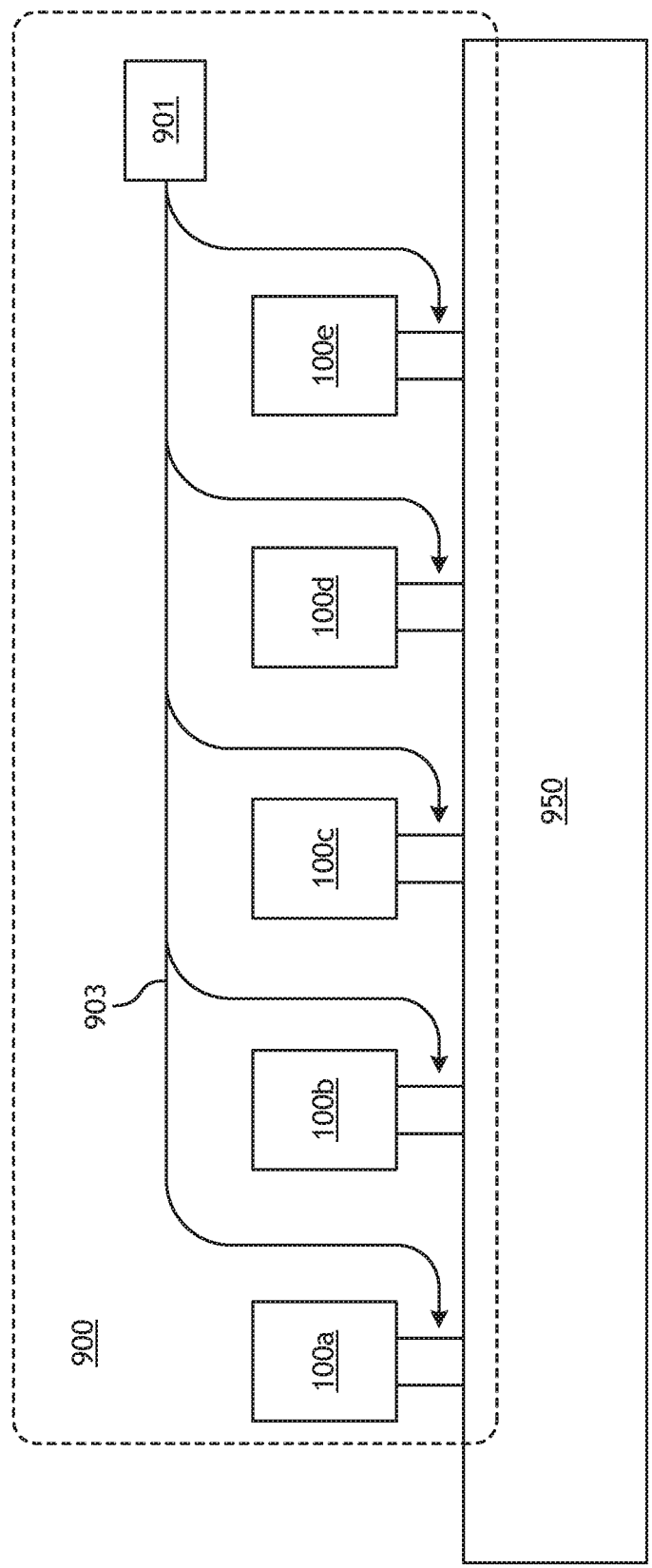
FIG. 9 illustrates a plurality of optical analysis devices linked in a network for distributed sensing.

FIG. 9 illustrates a plurality of optical analysis devices 100a-e (collectively referred to as optical analysis devices 100) linked in series and otherwise in a network 900 for distributed sensing. Network 900 includes at least one light source 901 to provide electromagnetic radiation 105 (FIG. 1) for each of optical analysis devices 100. Network 900 further includes an optical link 903 that couples electromagnetic radiation 105 through the optical input 130 (FIG. 1) in each optical analysis device 100 from light source 901.

Embodiments using fiber optic for optical link 903 enable distributed sensing with optical analysis devices 100 over a long distance in a wellbore. For example, in some embodiments, optical analysis device 100a may be located near or at the bottom or the toe of the wellbore, and optical analysis device 100e may be located near or at the surface of the wellbore. In some embodiments, network 900 for distributed sensing may be applied to oil and gas transportation piping.

Optical sensing devices 100 are compact, continuously monitoring sensors that can provide fluid data at specific sample points and times. Thus, network 900 may be used to correlate fluid characteristics between sample points at different locations in the pipeline, such as composition and flow velocity, among others. These measurements may be useful for flow characterization such as in a turbulent flow, or a break out point.

At the top of a horizontal pipeline, optical analysis devices 100 in network 900 may monitor a profile of a wax deposited in the interior surface of the horizontal pipeline by measuring a change in the saturates composition between different points along the pipeline. More water at a first point and less water at a second point downstream of the pipeline may indicate that hydrates (e.g., wax) have been deposited. In contrast, material characterization at the bottom of the pipeline may detect scale deposition (e.g., inorganic scales). Inorganic scales may include minerals deposited from water such as, but not limited to, calcium carbonate ($CaCO_3$), calcium sulfate ($CaSO_4$), barium sulfate ($BaSO_4$), strontium sulfate ($SrSO_4$), salt (NaCl), and the like. Accordingly, upon detection of these undesirable pipeline conditions, an operator may have maintenance or remediation procedures performed on the pipeline, such as introducing dehydrating substances and other hydrate inhibitors or descaling treatment fluids to the fluid flow.

Figure 10:
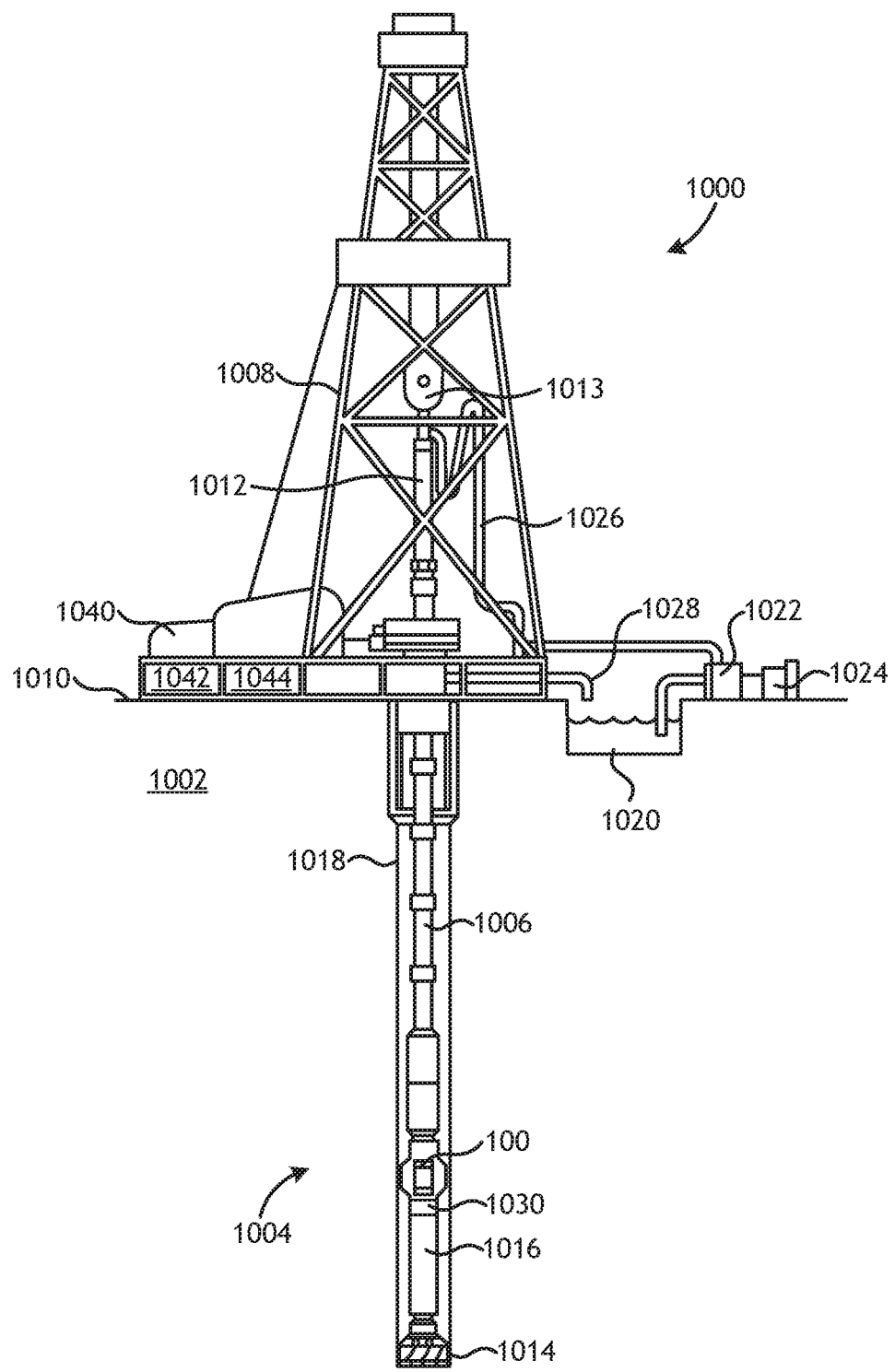
FIG. 10 illustrates a drilling system configured to use a calibrated optical sensor for modifying a drilling parameter in measurement-while-drilling (MWD) and logging-while-drilling (LWD) operations.

FIG. 10 illustrates a drilling system 1000 configured to use an optical analysis device for modifying a drilling parameter in measurement-while-drilling (MWD) and logging-while-drilling (LWD) operations. Boreholes may be created by drilling into the earth 1002 using the drilling system 1000. The drilling system 1000 may be configured to drive a bottom hole assembly (BHA) 1004 positioned or otherwise arranged at the bottom of a drill string 1006 extended into the earth 1002 from a derrick 1008 arranged at the surface 1010. The derrick 1008 includes a kelly 1012 and a traveling block 1013 used to lower and raise the kelly 1012 and the drill string 1006.

The BHA 1004 may include a drill bit 1014 operatively coupled to a tool string 1016 which may be moved axially within a drilled wellbore 1018 as attached to the drill string 1006. During operation, the drill bit 1014 penetrates the earth 1002 and thereby creates the wellbore 1018. The BHA 1004 provides directional control of the drill bit 1014 as it advances into the earth 1002. The tool string 1016 can be semi-permanently mounted with various measurement tools (not shown) such as, but not limited to, measurement-while-drilling (MWD) and logging-while-drilling (LWD) tools, that may be configured to take downhole measurements of drilling conditions. In other embodiments, the measurement tools may be self-contained within the tool string 1016, as shown.

Fluid or "mud" from a mud tank 1020 may be pumped downhole using a mud pump 1022 powered by an adjacent power source, such as a prime mover or motor 1024. The mud may be pumped from the mud tank 1020, through a stand pipe 1026, which feeds the mud into the drill string 1006 and conveys the same to the drill bit 1014. The mud exits one or more nozzles arranged in the drill bit 1014 and in the process cools the drill bit 1014. After exiting the drill bit 1014, the mud circulates back to the surface 1010 via the annulus defined between the wellbore 1018 and the drill string 1006, and in the process, returns drill cuttings and debris to the surface. The cuttings and mud mixture are passed through a flow line 1028 and are processed such that a cleaned mud is returned down hole through the stand pipe 1026 once again.

The BHA 1004 may further include a downhole tool 1030 similar to the downhole tools described herein. More particularly, downhole tool 1030 may include optical analysis device 100, as disclosed herein (cf. FIG. 1). Downhole tool 1030 may be controlled from the surface 1010 by a computer 1040 having a memory 1042 and a processor 1044. Accordingly, memory 1042 may store commands that, when executed by processor 1044, cause computer 1040 to perform at least some steps in methods consistent with the present disclosure.

Figure 11:
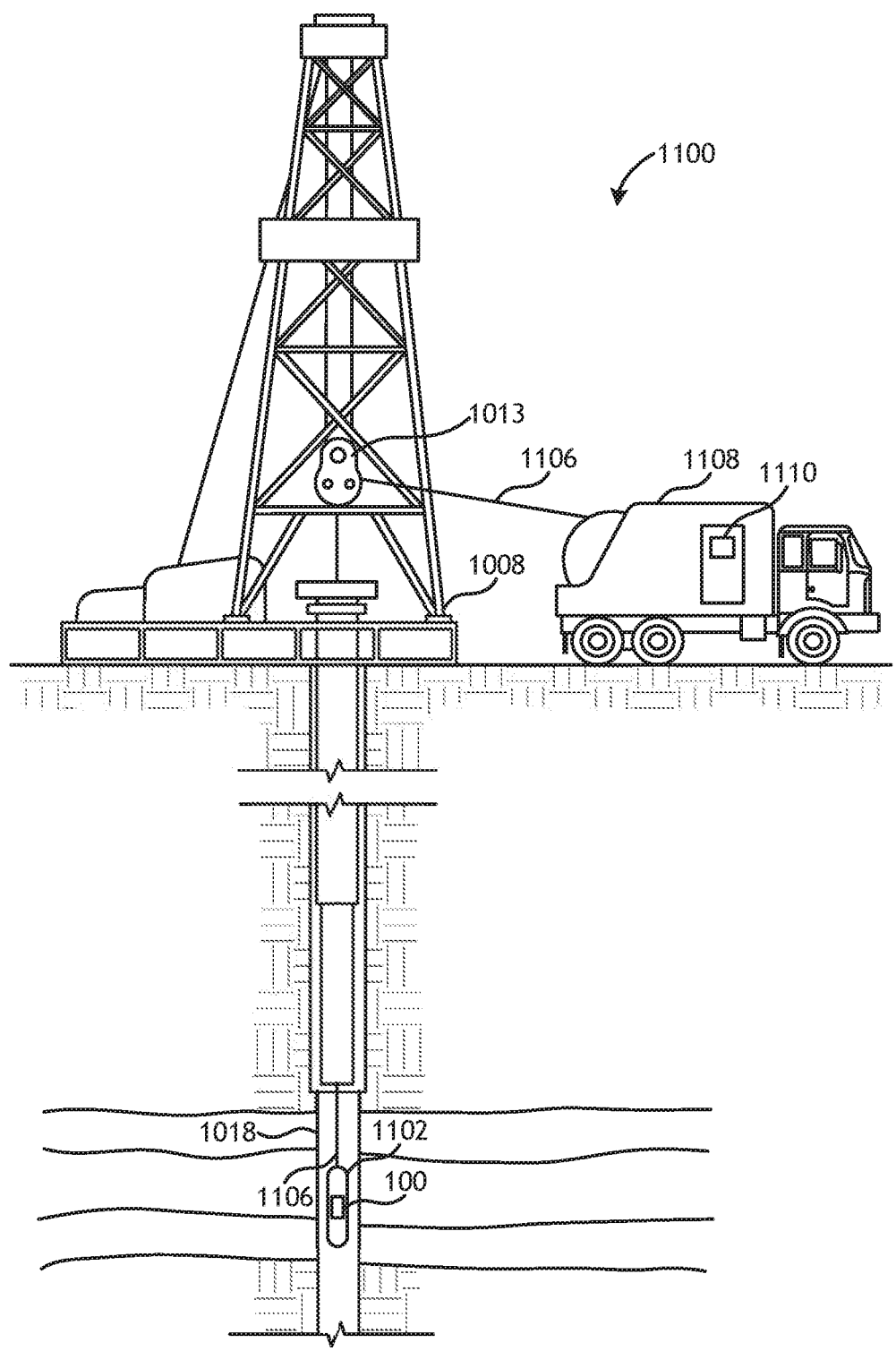
FIG. 11 illustrates a wireline system configured to use a calibrated optical sensor during formation testing and sampling.

FIG. 11 illustrates a wireline system 1100 configured to use a calibrated optical sensor during formation testing and sampling. In some embodiments, wireline system 1100 may be configured to use a formation tester and calibrated optical tool in determining types of formation fluids and the associated characteristics through sampling after drilling of wellbore 1018 is complete. System 1100 may include a downhole tool 1102 that forms part of a wireline logging operation that can include one or more optical analysis devices 100, as described with reference to FIG. 1. System 1100 may include the derrick 808 that supports the traveling block 1013. Wireline logging tool 1102, such as a probe or sonde, may be lowered by wireline or logging cable 1106 into the borehole 1018. Tool 1102 may be lowered to the potential production zone or the region of interest in the wellbore, and used in conjunction with other components of the formation tester such as packers and pumps to perform well testing and sampling. Optical analysis device 100 may be configured to measure optical responses of the formation fluids, and any measurement data generated by downhole tool 1102 and its associated optical analysis device 100 can be real-time processed for decision-making, or communicated to a surface logging facility 1108 for storage, processing, and/or analysis. Logging facility 1108 may be provided with electronic equipment 1110, including processors for various types of signal processing.

Figure 12:
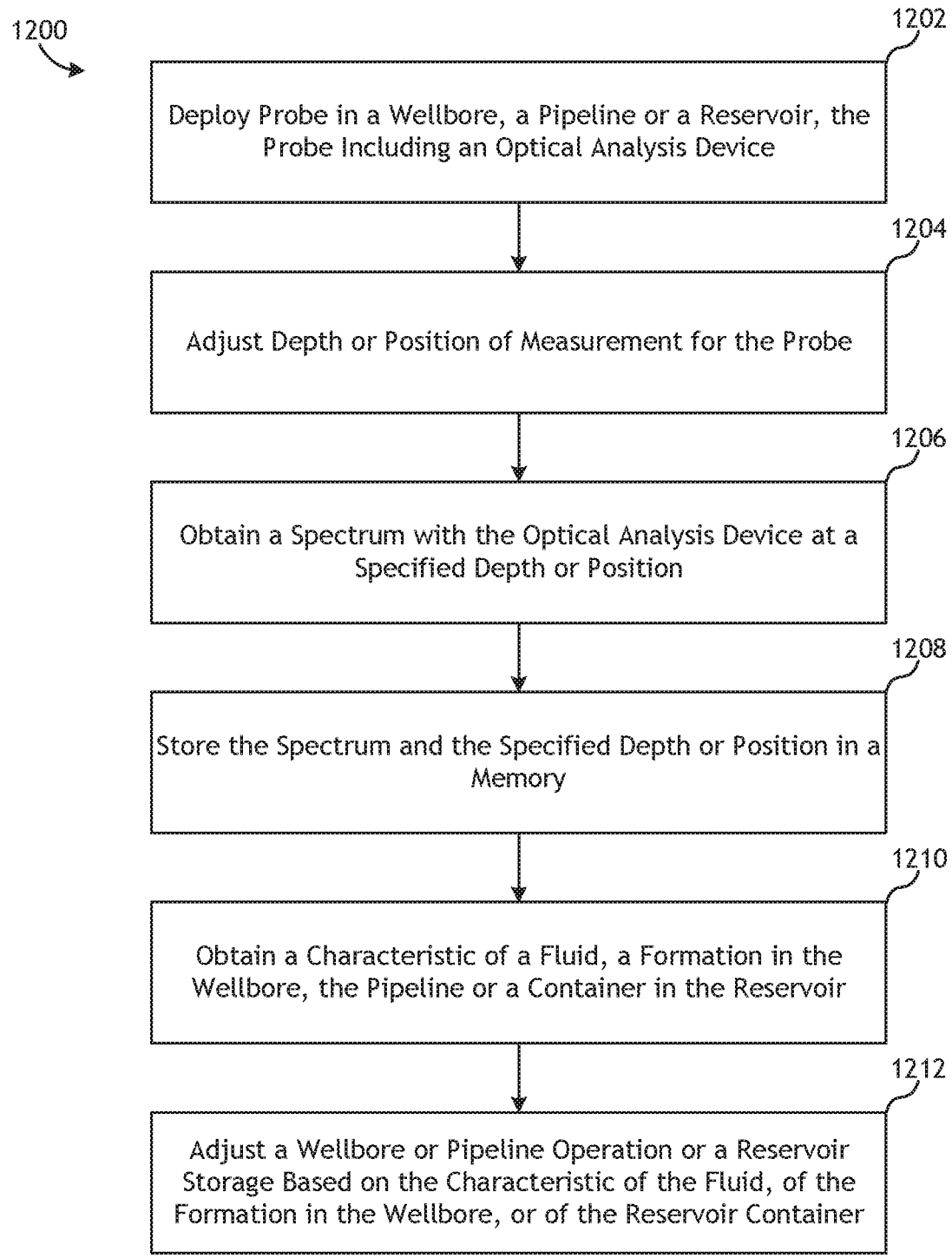
FIG. 12 illustrates a flow chart of steps in a method for adjusting a wellbore operation or a storage procedure based on a measurement provided by an optical analysis device attached to a probe in a tool.

FIG. 12 illustrates a flow chart of steps in a method 1200 for adjusting a wellbore operation or a storage procedure based on a measurement provided by an optical analysis device attached to a probe in a tool (e.g., optical analysis devices 100 and 710, probes 270, 370, 570, 670, 770, 870, and tools 200, 300, 400A,B, 500, 600, 700 and 800, cf. FIGS. 2, 3, 4A, 4B, 5, 6, 7, 8 and 9). In some embodiments, the optical analysis device includes a 2D waveguide layer configured to transmit and disperse an electromagnetic radiation according to wavelength, and includes a plurality of detector elements disposed along an edge (e.g., electromagnetic radiation 105, detector elements 110, edge 125, cf. FIG. 1). The optical analysis device may further include a substrate layer electrically coupled to the 2D waveguide layer to receive the signal from each of the detector elements, form a spectrum of the electromagnetic radiation with a processor, and store the spectrum in a memory (e.g., 2D waveguide layer 101, processor 111 and memory 112, cf. FIG. 1). The memory may include commands which, when executed by the processor, cause the optical analysis device to perform at least some of the steps in method 1200. The substrate layer may further include a device identifier so that the optical sensing device is remotely, or wirelessly identified by an external device (e.g., device identifier 115, cf. FIG. 1).

Embodiments consistent with method 1200 may include some but not all of the steps illustrated in FIG. 12. Moreover, in some embodiments steps in methods consistent with method 100 may be performed in a different sequence, or even overlapping at least partially in time with one another. Further, in some embodiments methods consistent with method 1200 may include any two or more of steps 1202 through 1212 performed simultaneously or almost simultaneously.

Step 1202 includes deploying the probe in a wellbore, a pipeline or a reservoir, the probe including an optical analysis device. Step 1204 includes adjusting a depth or position of measurement for the probe. Step 1206 includes obtaining a spectrum with the optical analysis device at a specified depth. In some embodiments, step 1206 includes providing an electromagnetic radiation to be interacted with a fluid in the wellbore or reservoir. Step 1206 may further include coupling the interacted electromagnetic radiation to the optical analysis device. Step 1206 may include releasing the optical analysis device into the wellbore or the reservoir at the specified depth and storing in a memory of the optical analysis device a value for the specified depth associated with the obtained spectrum. Further, step 1206 may include retrieving the optical analysis device from the wellbore or the reservoir. Alternatively, step 1206 may include transmitting the value of the specified depth associated with the obtained spectrum and the obtained spectrum itself to the surface via an electronic signal, or an acoustic signal through the fluid or the wireline in wireline, LWD or MWD applications.

Step 1208 includes storing the spectrum and the specified depth in a memory. In some embodiments, the probe includes an integrated characterization section (ICS) configured to measure a fluid density and a fluid pressure and step 1208 includes associating the fluid density and the fluid pressure to the stored spectrum. Step 1008 may include providing the spectrum and the specified depth to an operator remotely, or wirelessly using one of a radio-frequency antenna or a near field contact (NFC) circuit in the optical analysis device, or an acoustic data transmission through the fluid in the wellbore, pipeline or reservoir.

Step 1210 includes obtaining a characteristic of a fluid, a formation in the wellbore, a fluid flow in the pipeline or a container in the reservoir. The reservoir may be a cased or unused wellbore, and the container in the reservoir may include a storage device or a drum located downhole. More generally, the reservoir may be a body of fluid either in a subterranean formation or otherwise. Accordingly, the container in the reservoir may be a drum, a tank, a cement wall, or a wellbore casing. In some embodiments, step 1210 includes performing a multivariate regression analysis using the spectrum. Further, in some embodiments step 1210 includes performing a neural network analysis using the stored spectrum to obtain the characteristic of at least one fluid, or a condition of the wellbore, the pipeline, or the reservoir.

Step 1212 includes adjusting a wellbore or pipeline operation or a reservoir storage based on either one of the characteristic of the fluid, the formation in the wellbore, and the reservoir container. In some embodiments, adjusting the wellbore operation or the reservoir storage in step 1212 includes modifying a fluid in the wellbore or in the reservoir. Moreover, modifying a fluid in the wellbore or in the reservoir includes removing the fluid from the wellbore or the reservoir. For example, in some embodiments step 1212 includes adding an anti-bacterial additive to a hydrocarbon reservoir when the presence of bacteria is detected according to the characteristic obtained from a stored spectrum. In some embodiments, step 1212 includes adjusting a flow parameter in a pipeline operation. For example, step 1212 may include adjusting a pumping rate to modify a flow speed in the pipeline. Step 1212 may include reducing a pumping rate to avoid a break out point in the fluid flow, or increasing the pumping rate to enhance production when no break out point is detected. In some embodiments, adjusting a reservoir storage based on the characteristic obtained may include removing a wellbore or a section of the well bore from production, removing the fluid in a cased wellbore, flooding the cased wellbore with a fluid (e.g., water or gas), or re-opening the wellbore for oil and gas production.

In some embodiments, the probe includes a submersible robot and the optical analysis device includes a pressure sensor in the substrate layer. Accordingly, method 1000 may further include receiving by the processor in the substrate layer a fluid pressure value from the pressure sensor, and determining, with the processor, the specified depth for a spectrum obtained with the optical analysis device.

Embodiments disclosed herein include:

A. A tool, including a probe deployable within a wellbore and an optical analysis device coupled to the probe. The optical analysis device includes a two-dimensional (2D) waveguide layer to transmit and to disperse electromagnetic radiation according to wavelength, the 2D waveguide layer including a plurality of detector elements disposed along an edge of the 2D waveguide layer so that each detector element provides a signal associated with a pre-determined wavelength portion of the electromagnetic radiation. The optical analysis device also includes a substrate layer including a processor and a memory. The substrate layer being electrically coupled to the 2D waveguide layer to receive the signal from each detector element and form a spectrum of the electromagnetic radiation with the processor.

B. A method, including deploying a probe in one of a wellbore or a reservoir, the probe including an optical analysis device having a two-dimensional (2D) waveguide layer that transmits and disperses electromagnetic radiation according to wavelength. The method also includes adjusting a depth of measurement for the probe and obtaining a spectrum with the optical analysis device at a specified depth. The method may also include obtaining a characteristic of at least one of a fluid, a formation in the wellbore, or of a container in the reservoir, and adjusting one of a wellbore operation or a reservoir storage based on the characteristic.

C. A non-transitory, computer readable medium storing commands which, when executed by a processor in a tool, cause the tool to perform a method, the method including deploying a probe in one of a wellbore or a reservoir, the probe including an optical analysis device, the optical analysis device including a two-dimensional (2D) waveguide layer configured to transmit and disperse an electromagnetic radiation according to wavelength. The method may also include adjusting a depth of measurement for the probe and obtaining a spectrum with the optical analysis device at a specified depth. The method may also include obtaining a characteristic of at least one of a fluid, a formation in the wellbore, or a container in the reservoir, and adjusting one of a wellbore operation or a reservoir storage based on the characteristic of at least one of the fluid, the formation in the wellbore, or the container in the reservoir. In some embodiments, the adjusting the wellbore operation of the reservoir storage includes modifying a fluid in the wellbore or in the reservoir.

Each of embodiments A, B, and C may have one or more of the following additional elements in any combination. Element 1, wherein the optical analysis device is removably coupled to the probe. Element 2, further including a microfluidic device coupled with the optical analysis device to provide a fluid sample to interact with the electromagnetic radiation prior to transmitting the electromagnetic radiation to the 2D waveguide layer. Element 3, further including a light source optically coupled with the optical analysis device to provide the electromagnetic radiation. Element 4, further including a microfluidic device and a light source coupled to the optical analysis device to form a self-contained optical device, the self-contained optical device being removably coupled to the probe. Element 5, wherein the optical analysis device further includes a pressure sensor, and wherein the probe descends to a selected depth inside the wellbore and the processor determines an immersion depth associated with the spectrum, and the memory stores the spectrum and the selected depth. Element 6, wherein the optical analysis device comprises a plurality of optical analysis devices and the probe includes a plurality of interval control valves separating the probe into a plurality of zones, and wherein each zone includes at least one of the plurality of optical analysis devices. Element 7, wherein the optical analysis device comprises a plurality of optical analysis devices forming a network, and wherein the network includes a light source and an optical link that provides the electromagnetic radiation for each of the plurality of optical analysis devices from the light source. Element 8, wherein the optical analysis device further includes an identification circuit including at least one of a radio-frequency identifying tag, a radio-frequency antenna, and a near field contact circuit.

Element 9, wherein the probe includes a submersible robot and the optical analysis device includes a pressure sensor and a processor, the method further including receiving a fluid pressure value at the processor from the pressure sensor and determining the specified depth with the processor. Element 10, wherein obtaining a spectrum with the optical analysis device includes: providing interacting the electromagnetic radiation with a fluid in the wellbore or the reservoir; and providing the interacted electromagnetic radiation to the optical analysis device. Element 11, wherein obtaining a spectrum with the optical analysis device includes: releasing the optical analysis device into the wellbore or the reservoir at the specified depth, storing in the memory a value for the specified depth associated with the obtained spectrum, and retrieving the optical analysis device from the wellbore or the reservoir. Element 12, wherein obtaining a characteristic of the fluid, the formation in the wellbore, or the container in the reservoir includes performing a multivariate regression analysis using the spectrum. Element 13, further including: measuring a fluid density and a fluid pressure with an integrated characterization section included in the probe, storing the spectrum and the specified depth in the memory and associating the fluid density and the fluid pressure to the spectrum. Element 14, wherein storing the spectrum and the specified depth in the memory includes providing the spectrum and the specified depth to an operator using one of a radio-frequency antenna or a near field contact circuit in the optical analysis device. Element 15, wherein the reservoir is a subterranean reservoir including a cased wellbore, and adjusting a reservoir storage comprises one of reinforcing a wellbore casing or emptying the fluid content in the cased wellbore. Element 16, further including at least one of storing the spectrum and the specified depth in a memory, and transmitting the spectrum and the specified depth to a surface of the wellbore or the reservoir.

Element 16, wherein modifying a fluid in the wellbore or in the reservoir includes removing the fluid from the wellbore or the reservoir. Element 17, wherein obtaining a characteristic of a fluid, a formation in the wellbore, or a container in the reservoir includes performing a multivariate regression analysis with the spectrum. Element 18, wherein adjusting a depth of measurement for the probe includes measuring a fluid pressure with a pressure meter in the probe, and converting the fluid pressure into the depth of measurement with the processor in the tool.

By way of non-limiting example, exemplary combinations applicable to embodiments A, B, and C include: Element 1 with Element 2; Element 10 with Element 11, and Element 17 with Element 18.

Those skilled in the art will readily appreciate that the methods described herein or large portions thereof may be automated at some point such that a computerized system may be programmed to transmit data from an optical analysis device as disclosed herein. Computer hardware used to implement the various methods and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), electrically erasable programmable read only memory (EEPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A tool, comprising:
a probe deployable within a wellbore; and
an optical analysis device coupled to the probe, the optical analysis device including:
a two-dimensional (2D) waveguide layer to transmit and to disperse electromagnetic radiation according to wavelength, the 2D waveguide layer including a plurality of detector elements disposed along an edge of the 2D waveguide layer so that each detector element provides a signal associated with a pre-determined wavelength portion of the electromagnetic radiation; and
a substrate layer including a processor, the substrate layer being electrically coupled to the 2D waveguide layer to receive the signal from each detector element and form a spectrum of the electromagnetic radiation with the processor.

2. The tool of claim 1, wherein the optical analysis device is removably coupled to the probe.

3. The tool of claim 1, further including a microfluidic device coupled with the optical analysis device to provide a fluid sample to interact with the electromagnetic radiation prior to transmitting the electromagnetic radiation to the 2D waveguide layer.

4. The tool of claim 1, further including a light source optically coupled with the optical analysis device to provide the electromagnetic radiation.

5. The tool of claim 1, further including a microfluidic device and a light source coupled to the optical analysis device to form a self-contained optical device, the self-contained optical device being removably coupled to the probe.

6. The tool of claim 1, wherein the optical analysis device further includes a pressure sensor and a memory, wherein the probe descends to a selected depth inside the wellbore and the processor determines an immersion depth associated with the spectrum, and further wherein the memory stores the spectrum and the selected depth.

7. The tool of claim 1, wherein the optical analysis device comprises a plurality of optical analysis devices and the probe includes a plurality of interval control valves separating the probe into a plurality of zones, and wherein each zone includes at least one of the plurality of optical analysis devices.

8. The tool of claim 1, wherein the optical analysis device comprises a plurality of optical analysis devices forming a network, and wherein the network includes a light source and an optical link that provides the electromagnetic radiation for each of the plurality of optical analysis devices from the light source.

9. The tool of claim 1, wherein the optical analysis device further includes an identification circuit including at least one of a radio-frequency identifying tag, a radio-frequency antenna, and a near field contact circuit.

10. A method, comprising:
deploying a probe in one of a wellbore or a reservoir, the probe including an optical analysis device having a two-dimensional (2D) waveguide layer that transmits and disperses electromagnetic radiation according to wavelength;
adjusting a depth of measurement for the probe;
obtaining a spectrum with the optical analysis device at a specified depth; and
obtaining a characteristic of at least one of a fluid, a formation in the wellbore, or of a container in the reservoir.

11. The method of claim 10, further comprising at least one of:
storing the spectrum and the specified depth in a memory; and
transmitting the spectrum and the specified depth to a surface of the wellbore or the reservoir.

12. The method of claim 10, further comprising adjusting one of a wellbore operation or a reservoir storage based on the characteristic.

13. The method of claim 10, wherein the probe includes a submersible robot and the optical analysis device includes a pressure sensor and a processor, the method further including receiving a fluid pressure value at the processor from the pressure sensor and determining the specified depth with the processor.

14. The method of claim 10, wherein obtaining the spectrum with the optical analysis device includes:
interacting the electromagnetic radiation with a fluid in the wellbore or the reservoir; and
providing the interacted electromagnetic radiation to the optical analysis device.

15. The method of claim 10, wherein obtaining the spectrum with the optical analysis device includes:
releasing the optical analysis device into the wellbore or the reservoir at the specified depth;
storing in a memory a value for the specified depth associated with the obtained spectrum; and
retrieving the optical analysis device from the wellbore or the reservoir.

16. The method of claim 10, wherein obtaining the characteristic of the fluid, the formation in the wellbore, or the container in the reservoir includes performing a multivariate regression analysis using the spectrum.

17. The method of claim 10, further including:
measuring a fluid density and a fluid pressure with an integrated characterization section included in the probe; and
storing the spectrum and the specified depth in a memory and associating the fluid density and the fluid pressure to the spectrum.

18. The method of claim 17, wherein storing the spectrum and the specified depth in the memory includes providing the spectrum and the specified depth to an operator using one of a radio-frequency antenna or a near field contact circuit in the optical analysis device.

19. The method of claim 12, wherein the reservoir is a subterranean reservoir including a cased wellbore, and adjusting the reservoir storage comprises one of reinforcing a wellbore casing or emptying the fluid content in the cased wellbore.

20. A non-transitory, computer readable medium storing commands which, when executed by a processor in a tool, cause the tool to perform a method, the method comprising:
deploying a probe in one of a wellbore or a reservoir, the probe including an optical analysis device, the optical analysis device including a two-dimensional (2D) waveguide layer configured to transmit and disperse an electromagnetic radiation according to wavelength;
adjusting a depth of measurement for the probe;
obtaining a spectrum with the optical analysis device at a specified depth; and
obtaining a characteristic of at least one of a fluid, a formation in the wellbore, or a container in the reservoir.

21. The non-transitory, computer readable medium of claim 20, wherein the method further comprises at least one of:
storing the spectrum and the specified depth in a memory; and
transmitting the spectrum and the specified depth to a surface of the wellbore or the reservoir.

22. The non-transitory, computer readable medium of claim 20, wherein the method further comprises adjusting one of a wellbore operation or a reservoir storage based on the characteristic of at least one of the fluid, the formation in the wellbore, or the container in the reservoir, wherein the adjusting the wellbore operation of the reservoir storage includes modifying a fluid in the wellbore or in the reservoir.

23. The non-transitory, computer readable medium of claim 20, wherein modifying the fluid in the wellbore or in the reservoir includes removing the fluid from the wellbore or the reservoir.

24. The non-transitory, computer readable medium of claim 20, wherein obtaining the characteristic of the fluid, the formation in the wellbore, or the container in the reservoir includes performing a multivariate regression analysis with the spectrum.

25. The non-transitory, computer readable medium of claim 20, wherein adjusting the depth of measurement for the probe includes measuring a fluid pressure with a pressure meter in the probe, and converting the fluid pressure into the depth of measurement with the processor in the tool.

* * * * *